March 31, 1953 H. E. SMITH, JR Re. 23,640

LOCK-NUT STRUCTURE

Original Filed June 3, 1949

*INVENTOR.*

HERBERT E. SMITH, JR.

*BY* Wendling and Trent,

Attorneys

Reissued Mar. 31, 1953

Re. 23,640

UNITED STATES PATENT OFFICE 23,640

LOCK-NUT STRUCTURE

Herbert E. Smith, Jr., Cleveland, Ohio

Original No. 2,564,511, dated August 14, 1951, Serial No. 96,975, June 3, 1949. Application for reissue July 31, 1952, Serial No. 302,024

5 Claims. (Cl. 151—19)

Matter enclosed in heavy brackets [ ] appears in the original patent but forms no part of this reissue specification; matter printed in italics indicates the additions made by reissue.

This application is a continuation of my copending application Serial No. 659,978, filed April 5, 1946, now abandoned, and is a substitution therefor.

My invention relates to lock-nut structures.

This invention is directed to an improved structure of parts comprising a lock-nut adapted to be threaded upon a threaded member, such as a bolt, to hold a work piece, such as a plate, bar or other member, in position and secured in desired location by a nut.

An object of my invention is to provide improved co-action between separable parts of a lock-nut and assuring a secure grip of the nut on the bolt or other threaded member.

Another object is the provision of an improved lock-nut having the clamping action of the lock-nut distributed along a substantial longitudinal portion of the threaded member.

Another object is the provision of a lock-nut arranged to compress a plurality of threads of the lock-nut into firm engagement with the threads of a bolt upon which it is mounted.

Another object is the provision in a lock-nut structure of displacing radially inward several laps or spirals of the lock-nut thread inwardly to substantially fill the thread recess of a bolt for a considerable number of the convolutions of the threaded bolt, whereby the threads of the lock-nut and of the threaded bolt for a substantial portion of the length of the lock-nut are in full contact with each other.

Another object is the provision of an improved structure in a lock-nut having a tapered inner wall on the outer member and a tapered outer wall on the inner member comprising the lock-nut, the tapers of the respective walls being at different inclined angles to the axis of the lock-nut structure.

Another object is the provision of a lock-nut having an inner member and an outer member, having oppositely disposed tapered walls adapted to engage each other to cam the inner member radially inward upon a threaded member, the wall of the outer member being disposed on a faster taper than the wall of the inner member.

Another object is the provision of a lock-nut having opposed camming surfaces so disposed that after the inner member has been cammed inwardly to secure engagement with the threaded member to provide a firm locking action along a substantial portion of the length of the lock-nut, the opposed camming surfaces are in contact with each other along their substantial length and coincide with the same angle to the axis of the lock-nut structure.

Another object is the provision of a lock-nut structure that is economical of production and highly efficient in use.

Another object is the provision of a lock-nut assembly readily mounted and demounted in position on a threaded bolt and at the same time which provides superior gripping qualities for the lock-nut.

Other objects and a fuller understanding of my invention may be had by referring to the following description and claims, taken in conjunction with the accompanying drawing, in which:

Figure 4:
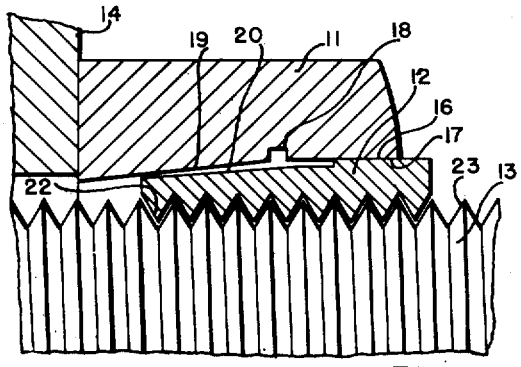
Figure 4 is an enlarged sectional view showing the detailed arrangement of the parts of my lock-nut structure while in assembled position but prior to the movement of the insert or inner member to a "home" or complete clamping position.
Figure 5:
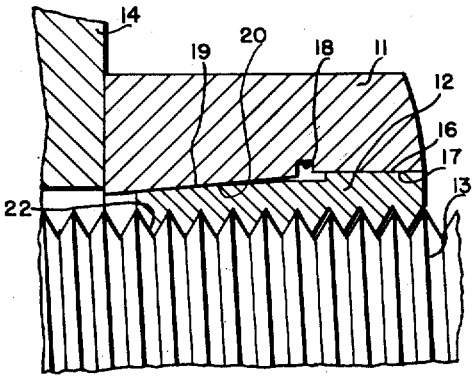
Figure 5 is a view somewhat like that of Figure 4 and shows the arrangement of the parts after the insert or inner member has been drawn to a "home" or firmly engaged position.
Figure 6:
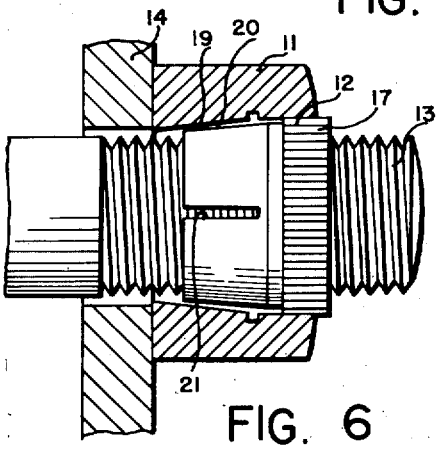
Figure 7:
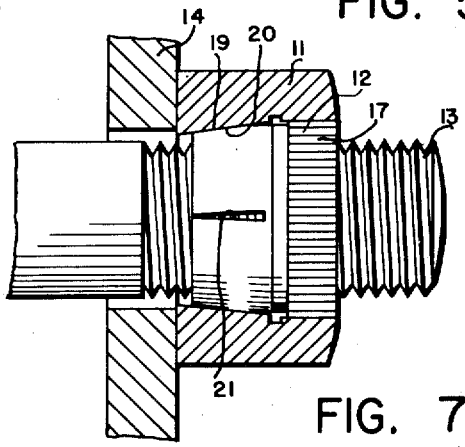

Figure 6 is a view of the assembled lock-nut structure when in the unlocked position of Figure 4 and shows the outer member in section and the inner member in full; and Figure 7 is a view of my lock-nut structure showing the insert member in the relative position of Figure 5, that is, in the "home" or firm clamping position, and shows the outer member in section and the inner or insert member in full.

In the several views of the drawing, the reference character 11 indicates an outer or shell member, having a centrally disposed aperture extending therethrough and adapted to receive an insert member. The inner or insert member is denoted by the reference character 12 and it is adapted to enter and engage in the central aperture of the shell member 11. The assembled lock-nut structure is adapted to be mounted on and threadably engaged to a threaded member 13, such as a bolt. For the purpose of illustrating the use and operation of the lock-nut structure, there is illustrated the work piece or limiting article 14, through which the threaded member 13 extends and which is to be secured against longitudinal movement by the lock-nut structure. The work piece 14 may be a plate, bar or any other object to be engaged by the lock-nut structure. The disposition of the work piece 14 is such that upon meeting the surface of the work piece 14, longitudinal movement of the lock-nut structure toward the work piece is stopped or limited by the opposition of the work piece.

The exterior surface of the outer or shell member 11 is in hexagonal form and is denoted by the reference character 15. The non-circular exterior surface 15 of the shell member is adapted to be engaged by a wrench or other turning tool. Any other arrangement for turning the lock-nut structure by a turning tool may be, of course, substituted for the hexagonal exterior surface 15.

For the purpose of this description, the right-hand side of the lock-nut structure and parts thereof in Figures 1, 4, 5, 6 and 7 will be indicated as the outer end. The end of the nut assembly on the left-hand side of said views will be referred to as the inner end of the structure and parts thereof, that is, the ends of the parts closest to the work piece 14 will be referred to as the inner end of said parts.

Adjacent the outer end of the shell member 11, the inner wall of the central aperture is provided with serrations 16 in the form of standard S. A. E. serrations. These serrations 16 are disposed around the inner peripheral wall of the shell member from its outer end rearwardly to the annular recess or relief 18. The annular recess or relief 18 is provided for ease in production and forming of the serrations 16 without leaving burrs or the like on the interior of the aperture after the broaching of the serrations 16 rearwardly to the location of recess 18.

Adjacent the outer end of the inner or insert member 12, and around its outer peripheral extent, are formed the serrations 17. The length of the serrations 17 are approximately the same as the length of the serrations 16 and the form of the serrations 17 is such that they complementarily engage with serrations 16. The interengagement of serrations 16 and 17 is such that upon moving the insert member 12 into the outer member 11 to a position where the serrations intermesh, such as to the position shown in Figures 1, 4 and 6, the outer member 11 and insert member 12 are locked against rotational movement relative to each other, that is, rotation of outer shell 11 causes the insert member 12 to rotate therewith. The fit of the interengaged serrations, however, is such that the insert member 12 may move longitudinally with respect to the shell member 11 so that there may be relative movement between the two members longitudinally of the threaded bolt, for example, from their relative longitudinal positions shown in Figures 1, 4 and 6 to the relative position of the parts shown in Figures 5 and 7. Other non-circular or appropriate disposition of the parts may be utilized for obtaining the interlocking of the two parts against rotational movement relative to each other.

Extending along a substantial portion of the length of the insert member 12 and closest to its inner or smaller end, the outer wall of the insert member 12 is provided with the tapered wall 20 of frusto-conical form. The taper of the tapered wall 20 is such that the wall is disposed at a first angle to the axis of the lock-nut structure. By way of example, I prefer to dispose the tapered wall 20 at an angle of 5½ degrees to the axis of the lock-nut structure. The angularity of the tapered wall 20 is such that the tapered wall 20 in relation to other parts of the lock-nut structure may be said to be on a "slow taper."

The inner arcuate wall of the outer or shell member 11 is provided with an opposing tapered surface 19. The inner tapered wall 19 of the shell member 11 is disposed at a second angle to the axis of the lock-nut structure. As the shell member and insert member are concentrically arranged, each has an axis coinciding with the axis of the assembled lock-nut structure. By way of example, the taper of the tapered wall 19 of the shell member 11 is preferably disposed at an angle of 7 degrees to the axis of the lock-nut structure. The angularity of the internal tapered wall 19 is such as to be described as being on a "fast taper" in relation to the other parts of the nut structure and particularly in relation to the opposing tapered surface 20. Therefore, since the angle of the tapered wall 20 is less than the angle of the tapered wall 19, the tapered wall of the insert member is referred to herein as being on a slow taper and the taper of the outer wall is said to be on a fast taper.

The insert member 12 is provided with two diametrically opposed slits, slots, or longitudinally extending cuts 21. The slits or slots 21 extend substantially the length of the tapered portion of the insert member and are provided for facilitating inward compression of the insert member along substantially the length of the tapered portion of the insert member. The lock-nut structure is preferably made of metal and the insert member is particularly preferably made of a metal that is resiliently flexible so that inward radial pressure on the outside of the insert member may cause the tapered wall portion of the insert member to compress about the threaded member 13. The provision of the opposite slits or slots 21 aid in permitting ready compression of the insert member along the tapered portion. The resiliency of the material from which the insert member is made is such that upon removal of compressive forces the insert member may assume its original disposition, such as in the position of Figures 1, 4 and 6. As the outer end of the insert member 12 is thicker than the inner end and as it is engaged to the shell member around its periphery, the slits 21 do not extend completely to the outer end of the insert member, and it is not necessary that they do so extend. Since the thicker outer end is engaged to the shell member it cannot circumferentially wrap around the threaded member and move circumferentially relative to the shell member, and therefore the extension of the slits forwardly through the thickened outer end would only weaken the insert member without providing the circumferential wrapping movement of the insert member around the threaded bolt at the outer end of the nut structure. By having multiple slits 21 the insert member 12 may be more readily compressed and a more efficient circumferential wrapping action around the bolt is effected upon inward compression of the insert member.

The insert member 12 is provided with internal threads 22 disposed along the central aperture therein. The threads 22 of the insert member are adapted to threadably enmesh with threads 23 on the bolt or threaded member 13. In the uncompressed condition of the insert member, the interfit of threads 22 and 23 is such that the nut structure may be readily turned upon the bolt 13 and without frictional resistance to the turning of the nut structure. A fairly loose and sloppy fit may be tolerated and a thread of one class, such as Class 3, may be used on the insert member, this classification referring to the degree of complementary fit of threads 22 relative to threads 23.

Figure 1:
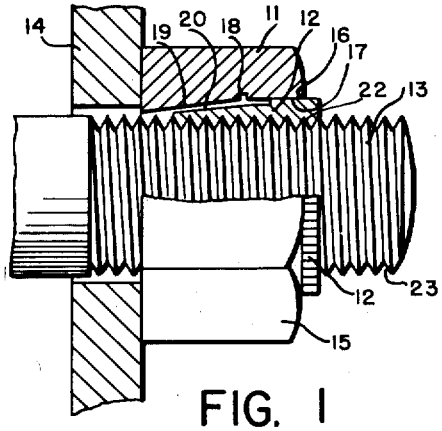
Figure 1 is a side view of my lock-nut structure mounted upon a threaded bolt to engage a work piece, and in which a portion of the lock-nut structure is shown in section.
Figure 2:
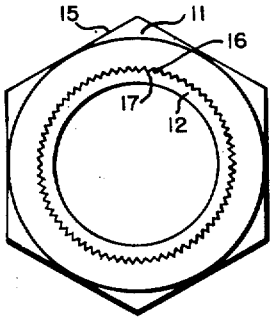
Figure 2 is a plan of my two-piece lock-nut structure showing the inner and outer members thereof in assembled position.
Figure 3:
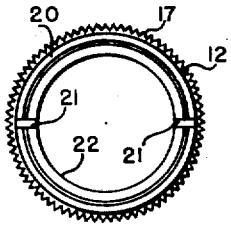
Figure 3 is an endwise view of the insert member or inner member of my lock-nut structure and is a view looking from the smaller end toward the larger end of the insert or inner member.

I prefer to have my two-member lock-nut structure in assembled position ready for placing on a threaded bolt with the parts generally arranged as shown in Figures 1, 4 and 6. In this loosely assembled arrangement, the insert member is partially within the shell member and the outer end of the insert member protrudes somewhat beyond the outer end of the shell member, as illustrated. Upon placing the thus assembled nut structure upon the threaded bolt 13 and loosely and quickly running the nut structure down on the bolt to where the shell member 11 initially engages the work piece 14, the parts will retain their relative position shown in Figures 1, 4 and 6. In this assembled and pre-tightening relationship, the turning of shell member 11 easily carries with it the insert member 12 by reason of the interengagement of the serrations 16 and 17. As soon as the shell member meets a stop or limiting piece, such as work piece 14, then further longitudinal movement of the shell member 11 along the threaded member 13 is prevented. Further rotation of the shell member 11 to rotate the insert member 12 causes the insert member to move inwardly along the bolt and to more closely nested position with the shell member so that the tapered surface 20 approaches the tapered surface 19. This further rotation of the shell member and the limitation of its longitudinal movement forces the tapered wall 20 against the tapered wall 19, and the opposition of said walls to each other causes a camming action so that the tapered portion of the insert member is readily compressed inward upon the threaded bolt. Upon initial engagement of the tapered walls, there is an included angle between them, but as the inward movement of the insert member progresses and the insert member is further compressed, the tapered walls come together until when the insert member is in a "home" or fully clamped position, the tapered walls 19 and 20 coincide and the external compressive force on the insert member is distributed along the tapered portion of the insert member. Although the tapered walls start out at different angles, they end up at the same angle by reason of the inward resilient compression of the insert member. After the insert member is compressed to where the threads 22 substantially fill the space between the threads 23 of the bolt along substantially the length of the tapered portion of the insert member, as illustrated in Figures 5 and 7, there is a circumferentially disposed and inwardly directed compressive force along a substantial portion of the length of the insert member, and particularly along the tapered portion thereof, and extending over several convolutions of the thread. The insert member is embraced along a distance of the threaded member including several convolutions of its thread, as for example in Figure 5 along at least three convolutions of the thread of the bolt.

The herein described construction is substantially different in function and in result from that obtained in prior nut structures having opposed tapered surfaces or walls which are initially, and before compression, disposed at the same angle to the axis of the structure, and also differs from arrangements wherein one wall of the opposed walls is straight or parallel to the axis and the other or opposing wall is on a taper. Neither of those prior constructions provides an action and result which is obtainable by the herein described construction and arrangement.

I prefer to make my insert member of case-hardened steel or other appropriate material providing the required amount of resiliency, compressibility and strength. In the case of insert members made of steel or material that is not too compressible in itself to the degree required for most uses, it is preferred to provide for this ready compressibility by the longitudinal slits 21. Preferably there are two slits 21 diametrically opposed to each other, although in some uses one slit may be sufficient and in other cases more than two slits may be desirable and provided. In the case of an insert member made of a material that is sufficiently compressible in itself for a particular use, as for example an insert member of silicon bronze for some uses, then the provision of the slits 21 may be found unnecessary for such uses to obtain the required resilient compressibility.

It is to be noted that the arrangement provides for a compression and gripping that is not confined to only the extreme inward end of the insert member and not limited to a location at one convolution of the thread. Rather this compression and clamping action by my device is distributed along a substantial length, and along several convolutions of thread, of the insert member.

The lock-nut structure may be readily unlocked from the position shown in Figures 5 and 7 by turning the shell member 11 in reverse a half-turn or turn or other amount, depending on the thread utilized, to back it away from the work piece 14. This permits relative longitudinal movement of the insert member and shell member to where one member moves longitudinally away from the other member and the parts will resume the relative position shown in Figures 1, 4 and 6. The resiliency of the insert member and the opposed wall surfaces provide such camming action that when this longitudinal relative movement between the parts is permitted, the insert member will move outwardly relative to the shell member. After resuming the position of Figures 1, 4 and 6, then the assembled lock-nut structure may be readily and freely turned upon the threaded bolt away from the work piece 14.

The arrangement provides a quick, sure and efficient collet-like gripping action of the lock-nut structure upon the bolt and so secures the lock-nut structure to the bolt that it is not disengaged or loosened by jars, shaking or vibration after the lock-nut structure has been moved into the "home" or locking position.

The present description includes by reference herein the disclosure contained in the appended claims which are hereby made a part of this disclosure.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A locking nut structure comprising a shell member having an engaging portion adapted to be engaged for turning, said shell member having a central insert-receiving aperture, and an insert member adapted to be received in said aperture in axial alignment therewith, said insert member having an axial length less than that of said shell member, the said shell member and said insert member at a first and outer end portion of each having axially extending, non-circular and complementary interengageable walls adapted to lock said members together against rotational movement relative to each other, the other and inner end portion of said shell member and said insert member having opposed tapered walls extending along substantially half the axial length of the insert member adapted to engage upon longitudinal movement of one member toward the other member, the [tapered wall of the] shell member extending toward the inner end beyond the tapered wall of the insert member upon engagement of said walls, the tapered wall of said shell member being on a faster taper than the tapered wall of the insert member along the axial extent of the engageable opposed tapered walls, said insert member having a threaded internal opening extending therethrough and adapted to threadably engage a threaded member, the tapered portion of said insert member being slit longitudinally so as to be compressible radially inward toward said threaded member, the rotation of said shell member and insert member non-rotatively engaged therewith on said threaded member and the limitation of longitudinal movement of the shell member causing relative movement in a longitudinal direction between said shell member and insert member and the said opposed tapered walls to meet along substantially the longitudinal length of the tapered wall of the insert member, the interaction of said opposed tapered walls upon meeting, compressing said insert member along substantially the longitudinal length of said opposed tapered walls and the conformance of the tapered wall of the insert member to the engaged tapered wall of the shell member.

2. A locking nut structure comprising a shell member having an engaging portion adapted to be engaged for turning, said shell member having a central insert-receiving aperture, and an insert member adapted to be received in said aperture in axial alignment therewith, the said shell member and said insert member at a first and outer end portion of each having axially extending, non-circular and complementary interengageable walls adapted to lock said members together against rotational movement relative to each other, the other and inner end portion of said shell member and said insert member having opposed tapered walls extending along the major part of the portion of the insert member axially extending from said non-circular wall to the inner end of the insert member, said opposed tapered walls being adapted to engage upon longitudinal movement of one member toward the other member, the [tapered wall of the] shell member extending toward the inner end beyond the tapered wall of the insert member upon engagement of said walls, the tapered wall of said shell member being on a faster taper than the tapered wall of the insert member along the axial extent of the engageable opposed tapered walls, said insert member having a threaded internal opening extending therethrough and adapted to threadably engage a threaded member, the tapered portion of said insert member being slit longitudinally substantially half the length of the insert member so as to be compressible radially inward toward said threaded member, the rotation of said shell member and insert member non-rotatively engaged therewith on said threaded member and the limitation of longitudinal movement of the shell member causing relative movement in a longitudinal direction between said shell member and insert member and the said opposed tapered walls to meet along the compressible tapered wall of the insert member, the interaction of said opposed tapered walls upon meeting, compressing said insert member along substantially the longitudinal length of the tapered wall of said insert member and the conformance of the tapered wall of the insert member to the engaged tapered wall of the shell member.

3. A locking nut structure comprising a shell member having an engaging portion adapted to be engaged for turning, said shell member having a central insert-receiving aperture, and an insert member adapted to be received in said aperture in axial alignment therewith, the said shell member and said insert member at an outer end portion of each having axially extending, non-circular and complementary interengageable walls adapted to lock said members together against rotational movement relative to each other, the inner end portion of said shell member and said insert member having opposed tapered walls, the tapered wall of said insert member being on a slower taper than the opposed tapered wall of the shell member, said slower taper being uniform throughout substantially the longitudinal length of the tapered wall of said insert member, said opposed tapered walls being adapted to engage upon longitudinal movement of one member toward the other member, the inner end of the shell member extending beyond the inner end of the insert member upon engagement of said opposed tapered walls, said insert member having a threaded internal opening extending therethrough and adapted to threadably engage a threaded member, the tapered portion of said insert member being slit longitudinally so as to be compressible radially inward toward said threaded member, the rotation of said shell member and insert member non-rotatively engaged therewith on said threaded member and the limitation of longitudinal movement of the shell member causing relative movement in a longitudinal direction between said shell member and insert member and the opposed tapered walls to meet along the compressible tapered wall of the insert member, the interaction of said opposed tapered walls upon meeting, compressing said insert member along the major portion of the longitudinal length of the tapered wall of said insert member and the conformance of the tapered wall of the insert member to the engaged tapered wall of the shell member.

4. A locking nut structure comprising a shell member having an engaging portion adapted to be engaged for turning, said shell member having a central insert-receiving aperture and an insert member adapted to be received in said aperture in axial alignment therewith, the said shell member and said insert member at an outer end portion of each having axially extending non-circular and complementary interengageable walls adapted to lock said members together against rotational movement relative to each other, the inner end portion of said shell member and said insert member having opposed tapered walls, the tapered wall of said insert member being on a slower taper than the opposed tapered wall of the shell member, said slower taper being uniform throughout substantially half the axial length of the insert member, said opposed tapered walls being adapted to engage upon longitudinal movement of one member toward the other member, the said axially extending non-circular and complementary walls of said shell member and insert member being in the form of a plurality of intermeshed serrations recurrently disposed around the circumferential extent of said insert member and whose maximum radius is greater than the maximum radius of the tapered wall of said shell member, said insert member having a threaded internal opening extending therethrough and adapted to threadably engage a threaded member, the tapered portion of said insert member being slit longitudinally so as to be compressible radially inward toward said threaded member, the rotation of said shell member and insert member non-rotatively engaged therewith on said threaded member and the limitation of longitudinal movement of the shell member causing relative movement in a longitudinal direction between said shell member and insert member and the opposed tapered walls to meet along the major portion of the longitudinal length of the uniformly tapered wall of said insert member and the conformance in taper of the opposed tapered walls to the tapered wall of said shell member.

5. A locking nut structure comprising a shell member having an engaging portion adapted to be engaged for turning, said shell member having a central insert-receiving aperture, and an insert member adapted to be received in said aperture in axial alignment therewith, the said shell member and said insert member at an outer end portion of each having axially extending, non-circular and complementary interengageable walls adapted to lock said members together against rotational movement relative to each other, the inner end portion of said shell member and said insert member having opposed tapered walls, the tapered wall of said insert member being on a slower taper than the opposed tapered wall of the shell member, said slower taper being uniform throughout substantially the longitudinal length of the tapered wall of said insert member, the said shell member having within said insert-receiving aperture an annular shoulder disposed therearound an axial distance from the outer end of the shell member, said axial distance being greater than the longitudinal length of the non-circular wall of said insert member to enable the non-circular wall to be received in said insert-receiving aperture, the diameter of said insert-receiving aperture at the location of said shoulder being less than the maximum diameter of the non-circular wall of said insert member, said opposed tapered walls being adapted to engage upon longitudinal movement of one member toward the other member, the inner end of the shell member extending beyond the inner end of the insert member upon engagement of said opposed tapered walls, said insert member having a threaded internal opening extending therethrough and adapted to threadably engage a threaded member, the tapered portion of said insert member being slit longitudinally so as to be compressible radially inward toward said threaded member, the rotation of said shell member and insert member non-rotatively engaged therewith on said threaded member and the limitation of longitudinal movement of the shell member causing relative movement in a longitudinal direction between said shell member and insert member and the opposed tapered walls to meet along the compressible tapered wall of the insert member, the interaction of said opposed tapered walls upon meeting, compressing said insert member along the major portion of the longitudinal length of the tapered wall of said insert member and the conformance of the tapered wall of the insert member to the engaged tapered wall of the shell member.

HERBERT E. SMITH, JR.

REFERENCES CITED

The following references are of record in the file of this patent or the original patent:

UNITED STATES PATENTS

| Number | Name | Date |
|---|---|---|
| 502,477 | Tolan et al. | Aug. 1, 1893 |
| 526,308 | Garvin | Sept. 18, 1894 |
| 730,599 | Bartley | June 9, 1903 |
| 764,662 | Gibbs | July 12, 1904 |
| 786,725 | Bryce | Apr. 4, 1905 |
| 818,584 | Treatt | Apr. 24, 1906 |
| 894,874 | Bryce | Aug. 4, 1908 |
| 1,324,012 | Johnson | Dec. 2, 1919 |
| 1,470,528 | Flentjen | Oct. 9, 1923 |
| 2,106,984 | Michell | Feb. 1, 1938 |
| 2,321,466 | Crowther | June 8, 1943 |